United States Patent
Beifus

[19]

[11] Patent Number: 6,104,113
[45] Date of Patent: Aug. 15, 2000

[54] COIL ASSEMBLY FOR SENSORLESS ROTOR ANGULAR POSITION CONTROL OF SINGLE PHASE PERMANENT MAGNET MOTOR

[75] Inventor: Brian L. Beifus, Fort Wayne, Ind.

[73] Assignee: General Electric Company, Schenectady, N.Y.

[21] Appl. No.: 09/078,864

[22] Filed: May 14, 1998

[51] Int. Cl.[7] .................................................. H02K 11/00
[52] U.S. Cl. .......................... 310/68 B; 310/156; 310/198; 310/179; 310/203; 310/68 B; 310/68 R; 310/216; 310/DIG. 6; 310/67 R; 318/254; 318/696; 318/721; 318/138; 318/332
[58] Field of Search .................................. 310/156, 198, 310/213, 216, 179, 174, 203, 208, 68 B, 67 R, DIG. 6, 68 R; 318/721, 138, 696, 254, 724, 331, 332

[56] References Cited

U.S. PATENT DOCUMENTS

| | | | |
|---|---|---|---|
| 2,474,647 | 6/1949 | Binney | 318/328 |
| 2,671,876 | 3/1954 | Spielberg et al. | 318/29 |
| 3,656,040 | 4/1972 | Babikyan | 318/168 |
| 4,039,875 | 8/1977 | Morreale | 310/194 |
| 4,080,543 | 3/1978 | Takahashi et al. | 310/213 |
| 4,109,170 | 8/1978 | Fujita et al. | 310/68 R |
| 4,169,990 | 10/1979 | Lerdman | 318/138 |
| 4,259,603 | 3/1981 | Uchiyama et al. | 310/68 B |
| 4,318,022 | 3/1982 | Miller | 310/260 |
| 4,346,335 | 8/1982 | McInnis | 318/351 |
| 4,359,657 | 11/1982 | Matsumoto et al. | 310/156 |
| 4,429,242 | 1/1984 | Layh | 310/71 |
| 4,450,396 | 5/1984 | Thornton | 318/721 |
| 4,455,513 | 6/1984 | Fulton et al. | 318/138 |
| 4,481,440 | 11/1984 | Muller | 310/268 |
| 4,577,139 | 3/1986 | Reinhardt et al. | 318/254 |
| 4,633,110 | 12/1986 | Genco et al. | 310/71 |
| 4,642,496 | 2/1987 | Kerviel et al. | 310/68 B |
| 4,642,537 | 2/1987 | Young | 318/254 |
| 4,658,162 | 4/1987 | Koyama et al. | 310/68 |
| 4,668,884 | 5/1987 | Amao et al. | 310/68 |
| 4,673,834 | 6/1987 | Wrobel | 310/71 |
| 4,734,631 | 3/1988 | Kamikura et al. | 318/685 |
| 4,743,815 | 5/1988 | Gee et al. | 318/254 |
| 4,757,241 | 7/1988 | Young | 318/254 |
| 4,763,053 | 8/1988 | Rabe | 318/254 |
| 4,864,176 | 9/1989 | Miller et al. | 310/194 |
| 4,900,968 | 2/1990 | Feigel et al. | 320/260 |
| 4,934,041 | 6/1990 | Hoover et al. | 29/596 |
| 4,961,017 | 10/1990 | Kakinoki et al. | 310/71 |
| 4,968,912 | 11/1990 | Shahamat et al. | 310/71 |
| 4,973,869 | 11/1990 | Cho | 310/68 B |
| 5,013,946 | 5/1991 | Sata | 310/40 MM |
| 5,023,527 | 6/1991 | Erdman et al. | 318/254 |

(List continued on next page.)

FOREIGN PATENT DOCUMENTS

| | | | |
|---|---|---|---|
| 54-057609 | 5/1979 | Japan | H02K 21/00 |
| 56-115164 | 9/1991 | Japan | H02K 19/36 |
| 5103454 | 4/1993 | Japan | H02K 29/12 |
| 1734172 | 5/1992 | U.S.S.R. | H02K 29/06 |
| 1774439 | 11/1992 | U.S.S.R. | H02K 29/00 |
| 1 382 670 | 4/1972 | United Kingdom | H02K 24/00 |

OTHER PUBLICATIONS

M. Jufer, "Back–EMF Indirect Detection for Self–Commutation of Synchronous Motors" European Power Electronics Conference, 1987, pp. 1125–1129.

*Primary Examiner*—Nestor Ramirez
*Assistant Examiner*—Thanh Lam
*Attorney, Agent, or Firm*—Senniger, Powers, Leavitt & Roedel; Damian Wasserbauer

[57] ABSTRACT

A coil assembly for sensorless rotor angular position control of a single phase permanent magnet motor. The coil assembly is positioned axially adjacent one end of the motor's rotor core in magnetic coupling relationship with the rotor and substantially independent of the magnetic coupling relationship between the main winding of the motor's stator and rotor. The coil assembly comprises a coil of wire and a coil fixture for holding the coil of wire.

24 Claims, 6 Drawing Sheets

U.S. PATENT DOCUMENTS

| | | | |
|---|---|---|---|
| 5,041,749 | 8/1991 | Gaser et al. | 310/156 |
| 5,070,264 | 12/1991 | Conrad | 310/68 B |
| 5,124,604 | 6/1992 | Swartz | 310/68 B |
| 5,128,572 | 7/1992 | Fausto | 310/68 R |
| 5,140,243 | 8/1992 | Lyons et al. | 318/701 |
| 5,157,293 | 10/1992 | Escaravage | 310/71 |
| 5,177,417 | 1/1993 | Lee et al. | 318/254 |
| 5,276,392 | 1/1994 | Beckerman | 318/751 |
| 5,300,884 | 4/1994 | Maestre | 324/207 |
| 5,329,195 | 7/1994 | Horber et al. | 310/68 B |
| 5,332,939 | 7/1994 | Fanning et al. | 310/71 |
| 5,376,866 | 12/1994 | Erdman | 318/138 |
| 5,384,527 | 1/1995 | Rozman et al. | 322/10 |
| 5,389,846 | 2/1995 | Okazaki et al. | 310/40 MM |
| 5,406,155 | 4/1995 | Persson | 310/68 B |
| 5,423,192 | 6/1995 | Young et al. | 62/228 |
| 5,440,219 | 8/1995 | Wilkerson | 318/802 |
| 5,465,019 | 11/1995 | Kliman | 310/156 |
| 5,483,139 | 1/1996 | Welles, II | 318/782 |
| 5,492,273 | 2/1996 | Shah | 236/44 A |
| 5,506,487 | 4/1996 | Young et al. | 318/811 |
| 5,534,763 | 7/1996 | Williams et al. | 318/799 |
| 5,548,197 | 8/1996 | Unsworth et al. | 318/757 |
| 5,583,404 | 12/1996 | Karwath et al. | 318/254 |
| 5,592,058 | 1/1997 | Archer et al. | 318/254 |
| 5,598,071 | 1/1997 | Dunfield et al. | 318/254 |
| 5,675,231 | 10/1997 | Becerra et al. | 318/801 |
| 5,679,997 | 10/1997 | Matsuzawa et al. | 310/254 |
| 5,838,127 | 11/1998 | Young et al. | 318/293 |

FIG_1

FIG_2

FIG. 6(c) INT

FIG. 6(d) CMM

COIL ASSEMBLY FOR SENSORLESS ROTOR ANGULAR POSITION CONTROL OF SINGLE PHASE PERMANENT MAGNET MOTOR

BACKGROUND OF THE INVENTION

This invention relates generally to single phase permanent magnet motors and more particularly to a coil assembly for sensorless rotor angular position control of a single phase permanent magnet motor.

Conventional hermetic refrigerator compressors, for example, typically use fixed speed single phase induction motors. On the other hand, variable speed operation of motors is advantageous for improving efficiency. Although conventional three phase permanent magnet (PM) motors, such as those being used for heating, ventilating, and air conditioning applications, are capable of variable speed operation, they are more expensive than single phase PM motors which require fewer power semiconductor switches and associated gate drivers.

Single phase PM motors require a suitable current commutation signal synchronized with the rotor position for proper operation. In single phase applications, a Hall-effect position sensor is typically used to detect the rotor position and thereby control the motor. Such single phase motors having a Hall-effect sensor, however, have several disadvantages. For example, the reliability of Hall sensors is uncertain in environments such as refrigerator compressors. Further, position sensors require additional leads which are not desirable in certain environments.

In order to avoid the use of a Hall sensor or other rotor position sensor, various sensorless control schemes have been developed for PM motors. In three phase PM motors under normal operation, there are times when one phase is open-circuited and has no current flowing in it. Under such conditions, the terminal voltage is equal to the back EMF voltage and can thus be sensed directly. Single phase motors, however, do not have natural intervals where the phase current remains zero for any length of time, and this approach is therefore not applicable.

For three phase motors, even if the phase current is non-zero, the back EMF voltage can be calculated by modeling the motor as a resistance, inductance, and back EMF voltage source, as described by M. Jufer, "Back-EMF Indirect Detection for Self-Commutation of Synchronous Motors," *European Power Electronics Conference*, 1987, pp. 1125–29. Although this technique can be applied to single phase PM motors, it is difficult to provide a controllable preferred direction of rotation. Thus, the motor can start in either direction, depending on the initial rotor angular position. Fan and compressor drives generally are designed to operate in only one direction of rotation, so control over the rotation direction is critical. Furthermore, the required knowledge of the motor parameters is not always available and is subject to production and operating variations.

Commonly assigned application Ser. No. 08/680,010, filed Jul. 15, 1996, the entire disclosure of which is incorporated herein by reference, describes a quadrature winding suitable for generating a position signal in a single phase motor. Further improvements, however, are desired.

SUMMARY OF THE INVENTION

Among the several objects of this invention may be noted the provision of an improved single phase motor and method of operating the motor which permits sensorless rotor position control; the provision of such motor and method which permits operation in a preferred running direction in severe environments; the provision of such motor and method which is not subject to PM gap jitter; the provision of such motor and method which is easily mounted; the provision of such motor and method which does not require a special winding procedure of the stator; the provision of such motor and method which is independent of the stator and has a predefined angular relationship with the rotor; and the provision of such motor and method which is economically feasible and commercially practical.

Generally, a motor embodying aspects of the invention includes a rotor having a generally cylindrical rotor core and a plurality of permanent magnet elements. The permanent magnet elements are situated radially on an outer surface of the rotor core so that each permanent magnet element has an axially facing end portion which extends past one end of the rotor core. The motor also includes a stator having a main winding which is in magnetic coupling relationship with the rotor. The stator and rotor are positioned radially with respect to each other and define an air gap therebetween. The end portion of the permanent magnet elements also extends past one end of the stator. The motor further includes a coil assembly for generating an output signal representative of rotor angular position relative to the stator. The coil assembly is positioned axially adjacent the one end of the rotor core and is in magnetic coupling relationship with the rotor. The coil assembly is substantially independent of the magnetic coupling relationship between the main winding of the stator and the rotor. The coil assembly comprises a coil of wire and a coil fixture for holding the coil of wire. The motor also includes a control circuit that receives and is responsive to the output signal for commutating the main winding as a function of the rotor angular position.

Another embodiment of the invention is directed to a position sensor for use with a motor having a rotor and a stator. The rotor has a generally cylindrical rotor core and a plurality of permanent magnet elements. The permanent magnet elements are situated radially on an outer surface of the rotor core so that each permanent magnet element has an axially facing end portion which extends past one end of the rotor core. The motor's stator has a main winding which is in magnetic coupling relationship with the rotor. The stator and rotor are positioned radially with respect to each other and define an air gap therebetween. The end portion of the permanent magnet elements also extend past one end of the stator. The position sensor comprises a coil of wire and a coil fixture, having a plurality of pole pieces, for holding the coil of wire. The position sensor is positioned substantially independent of the magnetic coupling relationship between the main winding of the stator and the rotor and axially adjacent the one end of the rotor core so that the coil of wire and pole pieces are in magnetic coupling relationship with the rotor. A pair of leads connected to the ends of the coil of wire provides an output signal representative of current induced in the coil of wire as a function of the rotor angular position relative to the stator.

Yet another embodiment is directed to a method of generating a rotor angular position signal for use in controlling a motor. The motor includes a rotor and stator positioned radially with respect to each and defining an air gap therebetween. The rotor has a generally cylindrical rotor core and a plurality of permanent magnet elements situated thereon and the stator has a main winding in magnetic coupling relationship with the rotor. The method includes situating the permanent magnet elements on an outer surface of the rotor core so that each permanent magnet element has an axially facing end portion which extends past one end of the rotor core and which also extends past one end of the stator. A coil assembly is assembled for generating an output signal representative of rotor angular position relative to the stator by winding a coil of wire into a generally circular shape and retaining the coil of wire in a coil fixture wherein the coil fixture and coil of wire have a mating relationship. The method also includes positioning the coil assembly axially adjacent the one end of the rotor core in magnetic coupling relationship with the rotor and substantially independent of the magnetic coupling relationship between the rotor and the stator.

Alternatively, the invention may comprise various other systems and methods.

Other objects and features will be in part apparent and in part pointed out hereinafter.

DETAILED DESCRIPTION OF PREFERRED EMBODIMENTS

Figure 1:
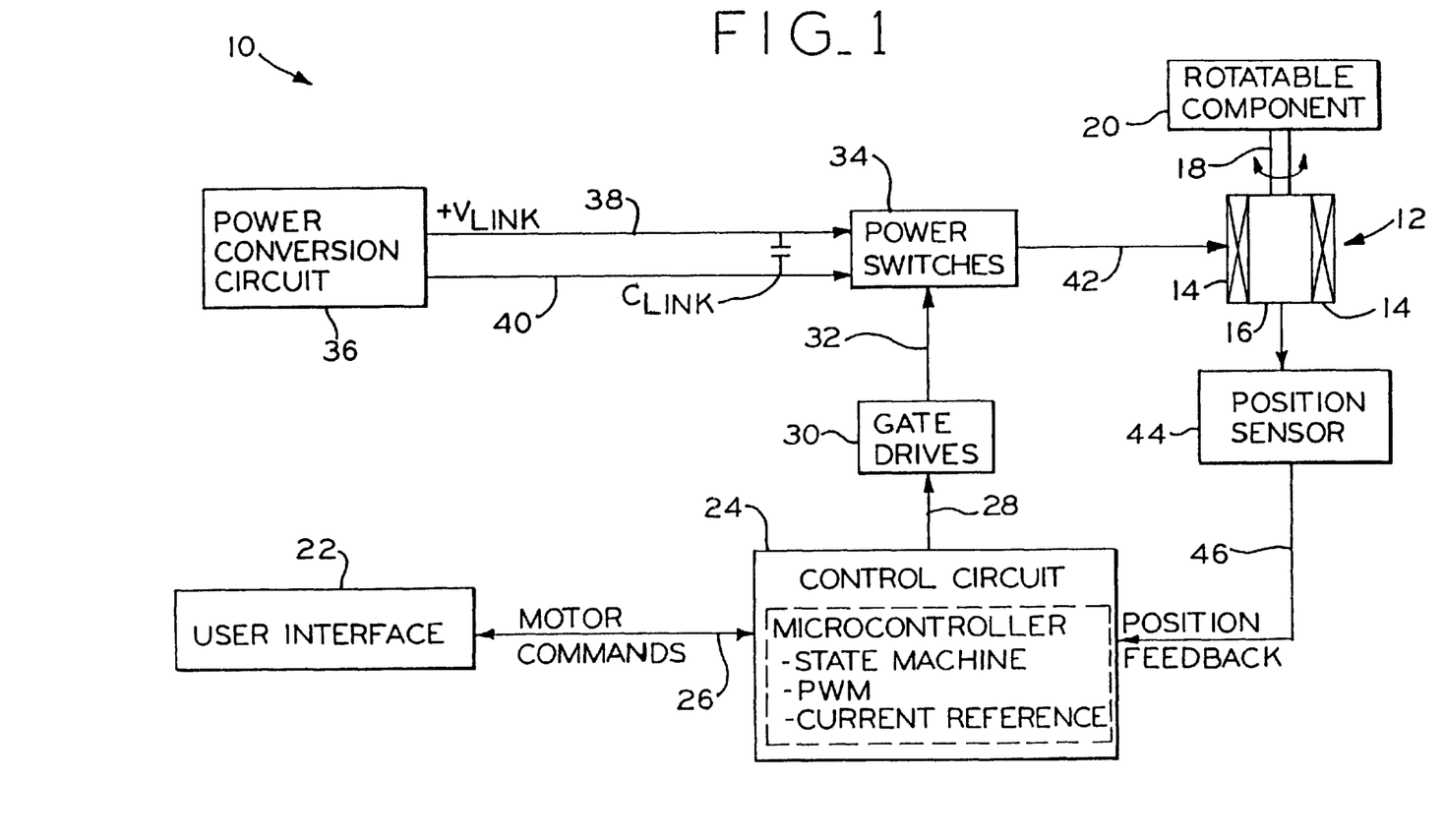
FIG. 1 is a block diagram of a motor system according to a preferred embodiment of the invention.

Referring now to FIG. 1, a motor system, generally indicated at 10, embodies aspects of the present invention. The system 10 includes a motor, generally indicated at 12, which has a stationary assembly, or stator, 14 and a rotatable assembly, or rotor, 16 in magnetic coupling relation to the stator 14. As an example, motor 12 is an electronically commutated or brushless motor which has permanent magnets mounted on its rotor 16. As is known in the art, the stator 14 of such a motor has a plurality of teeth and one or more wire-wound coils, or windings, on the teeth. The winding or windings on stator 14, when energized with current, interact with the permanent magnet rotor 16 to produce positive or negative torque, depending on the direction of the current relative to the polarity of the magnets. An electronic inverter bridge typically controls energization of the motor windings for controlling the direction and amount of torque produced by motor 12.

In the embodiment described herein, the motor 12 is a single phase, electronically commutated permanent magnet motor. For example, commonly assigned application Ser. No. 08/760,470, filed Dec. 5, 1996, the entire disclosure of which is incorporated herein by reference, describes a motor and control with which the present invention is suitable for use. It is contemplated, however, that aspects of the present invention may be applicable to various electronically controllable motors or dynamoelectric machines typically powered by an electronic control circuit. Such motors include, for example, external rotor motors (i.e., inside out motors), permanent magnet motors, single and variable speed motors, selectable speed motors having a plurality of speeds, brushless DC motors, electronically commutated motors, switched reluctance motors and induction motors. Such motors may also provide one or more finite, discrete rotor speeds selected by an electrical switch or other control circuit.

In a preferred embodiment of the invention, a motor shaft 18 mechanically connects rotor 16 to a particular device to be driven, such as a rotatable component 20. For example, the rotatable component 20 comprises a compressor, fan, blower or the like for use in a refrigeration system or heating, ventilating and air conditioning system. Although motor 12 is particularly useful for driving a compressor, it is to be understood that motor 12 may be part of a number of different systems for driving other rotatable components. For example, rotatable component 20 may be an agitator and/or basket of a washing machine. In addition, rotatable component 20 may also include a connection mechanism for coupling it to the shaft 18. For example, commonly assigned U.S. Pat. Nos. RE 33,655, 5,492,273, 5,423,192, 5,418,438 and 5,376,866, the entire disclosures of which are incorporated herein by reference, describe various rotatable components.

A user interface, or system control, 22 preferably provides system control signals to a control circuit 24 via line 26. In one embodiment, the user interface 22 is a thermostat and the system control signals take the form of motor commands representing, for example, turn on and turn off commands, desired speed commands and the like. In response to the system control signals, the control circuit 24 then generates motor control signals. As represented by the block diagram of FIG. 1, control circuit 24 provides the motor control signals via line 28 for electronically controlling a plurality of gate drives 30. In turn, the gate drives 30 provide drive signals via line 32 for switching a plurality of power switches 34 (e.g., insulated gate bipolar transistors, bipolar junction transistors or metal oxide silicon field effect transistors). In addition to providing sufficient voltage (e.g., 15 volts) for driving the power switches 34, gate drives 30 also condition the signals provided by control circuit 24 for optimal operation of power switches 34. In a preferred embodiment of the invention, control circuit 24 is embodied by a microprocessor or microcontroller and/or an application specific integrated circuit (ASIC) or universal electronically commutated motor integrated circuit (UECM IC).

Referring further to FIG. 1, a power conversion circuit 36 provides high voltage DC power (e.g., 200–300 volts) to power switches 34 via lines 38, 40. In turn, power switches 34 selectively switch the lines 38, 40 in connection with a motor winding (See FIG. 3) of stator 14. A line 42 represents the connection between power switches 34 and the motor winding. In this manner, power conversion circuit 36 supplies power to motor 12 via power switches 34. Preferably, power switches 34 are responsive to control circuit 24 for causing the motor winding to be energized in a preselected sequence for commutating motor 12. In this instance, control circuit 24 selectively activates power switches 34 to control rotation in motor 12 as a function of the motor control signals. It is to be understood that power conversion circuit 36 may also provide power to operate control circuit 24.

As an example, an inverter bridge embodies power switches 34 for driving motor 12. The inverter bridge includes a number of power switching devices (i.e., power switches 34) with a flyback diode coupled to each of the devices and is used to selectively connect the winding of motor 12 to power conversion circuit 36. A preferred inverter bridge for single phase motor 12 has two lower switches and two upper switches that form the arms of an H-bridge configuration wherein the cross-piece of the H is the winding. Commonly assigned application Ser. No. 08/865,135, filed May 29, 1997, the entire disclosure of which is incorporated herein by reference, describes a gate drive for driving the inverter bridge circuit of a single phase electronically commutated motor.

The inverter bridge circuit has an upper, or positive, rail (i.e., line 38) and a negative, or lower, rail (i.e., line 40) supplied by power conversion circuit 36. A shunt resistor, current transformer, Hall-effect current sensor, integrated current sensor or other sensor or circuit known in the art may be used to sense the winding, or motoring, current of motor 12. In this embodiment, rails 38, 40, in combination with a link capacitor $C_{LINK}$, constitute a power supply link, also referred to as a DC link, for providing DC power to the motor winding of stator 14. Commonly assigned U.S. Pat. No. 5,513,058, the entire disclosure of which is incorporated herein by reference, discloses a preferred DC link circuit for an electronically commutated motor.

FIG. 1 also illustrates the relationship between motor 12 and a position sensor 44. The position sensor 44 generates an output signal received by control circuit 24 via line 46 which is representative of the angular position of rotor 16 relative to stator 14. In general, the output signal has a predefined angular relationship relative to the back electromotive force (EMF) of motor 12 (e.g., either in phase or approximately 90° out of phase with the back EMF).

Preferably, control circuit 24 generates the motor control signals as a function of the zero crossings of the back EMF of the motor winding. In this instance, the product of the current and the back EMF determines torque production in motor 12. By energizing the winding when the back EMF has crossed zero in the direction that will oppose the voltage energizing it, motor 12 sustains positive torque. Since it is desired that motor current crosses zero at the time the motor back EMF also crosses zero, control circuit 24 preferably commutates motor 12 at an angle relative to the next back EMF zero crossing. In other words, control circuit 24 estimates subsequent back EMF zero crossings based on the sensed position of rotor 16 and generates gate drive signals at line 32 for driving power switches 34 coincident with or in advance of the estimated back EMF zero crossings. Thus, control circuit 24 generates the motor control signals as a function of the sensed position of rotor 16 as represented by the output signal. As an example, commonly assigned U.S. Pat. No. 5,423,192 describes one preferred means for detecting zero crossings.

In operation, control circuit 24 implements a state machine in response to the system control signals for generating motor control signals that define desired commutation intervals. When power switches 34 are switched in response to the motor control signals, system 10 produces a motor current that matches the load torque demand as a function of a regulated current reference level. The current in the motor winding produces an electromagnetic field for rotating the rotor 16 of motor 12. By matching torque load with produced torque, motor 12 is able to operate at a desired torque or speed. System 10 controls the speed of rotatable component 20 by controlling the power delivered to the load via power switches 34 which controls the speed of motor 12. In particular, system 10 regulates current in motor 12, which in turn regulates torque, to obtain the desired motor speed by matching the load and motor loss demand torque at the desired speed.

Preferably, control circuit 24 selects one of the active power switches 34 for use in controlling the motor current. The control signals include, for example, a series of pulse width modulated cycles, wherein each cycle causes a corresponding switching event of the selected switch. In a preferred embodiment, the selected switch performs pulse width modulation of the power applied to the winding to control the motor current during any given commutation interval. Commonly assigned U.S. Pat. No. 4,757,603, the entire disclosure of which is incorporated herein by reference, shows an exemplary PWM control of a motor. Commonly assigned application Ser. No. 08/647,694, filed May 15, 1996, the entire disclosure of which is incorporated herein by reference, discloses a system for regulating motoring current and controlling circulating currents in a single phase motor.

Figure 2:
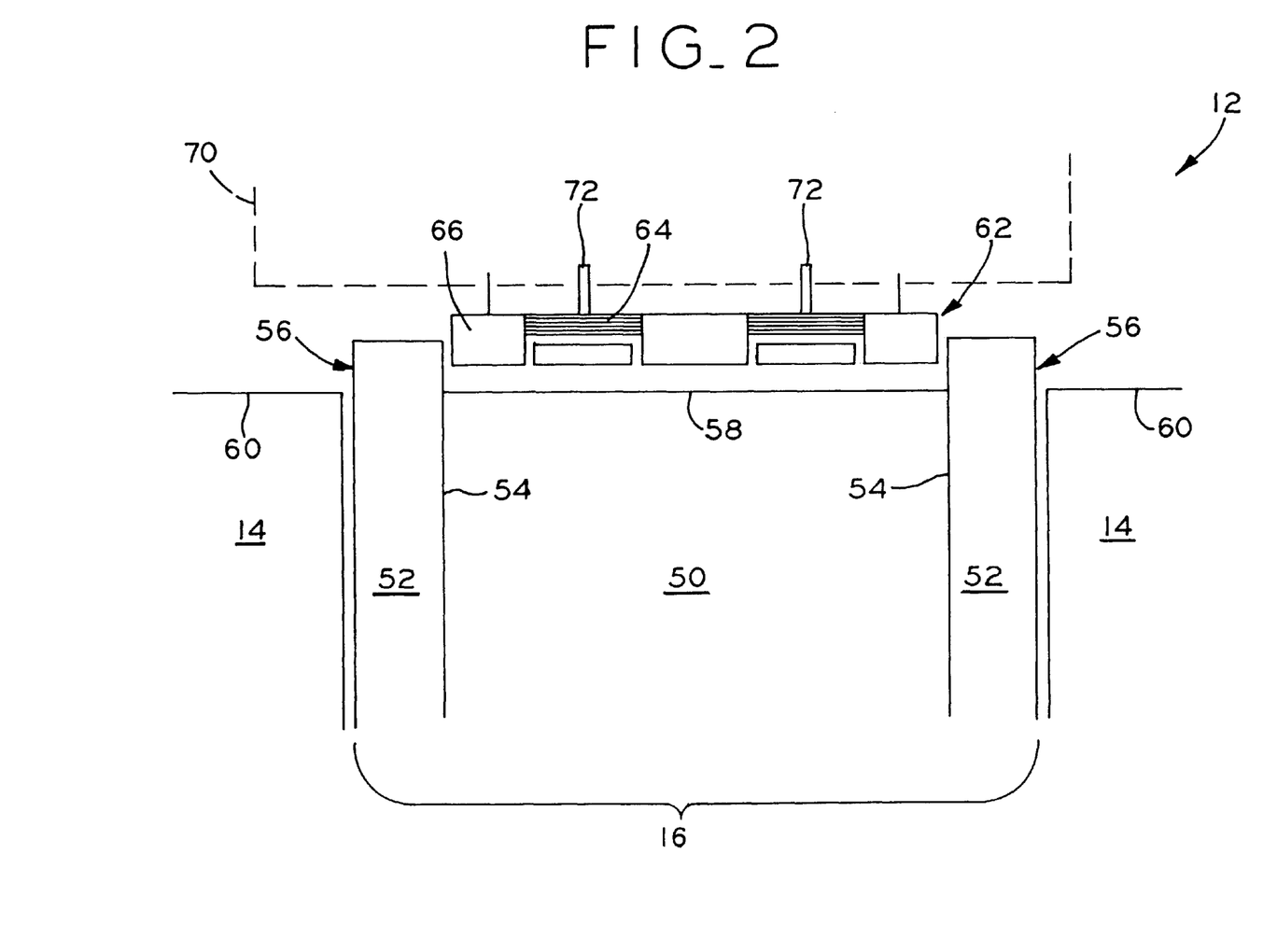
FIG. 2 is a fragmentary side view of the motor of FIG. 1 including a stator and a rotor having permanent magnets situated thereon and having a coil assembly positioned adjacent the rotor for generating an output signal representative of rotor angular position relative to a stator in accordance with the present invention.

Referring now to FIG. 2, one preferred embodiment of the motor 12 is illustrated. As shown, motor 12 is a single phase permanent magnet motor having a generally cylindrical rotor core 50 and a plurality of permanent magnet elements 52 which form rotor 16. The permanent magnet elements 52 are situated radially on an outer surface 54 of the rotor core 50. Each permanent magnet element 52 has an axially facing end portion generally indicated at 56 which extends past one end 58 of the rotor core 50. The motor 12 also includes stator 14 having a main winding (shown in FIG. 3) that is in magnetic coupling relationship with the rotor 16. The stator and rotor are positioned radially with respect to each other and define an air gap therebetween. The end portion 56 of the permanent magnet elements 52 also extends past one end 60 of the stator 14.

As shown in FIG. 2, a coil assembly 62 constitutes the position sensor 44. The coil assembly 62 is positioned axially adjacent the one end 58 of the rotor core 50 and in magnetic coupling relationship with the rotor 16 for generating an output signal representative of rotor angular position relative to the stator.

The coil assembly 62 comprises a coil of wire 64 and a coil fixture 66 for holding the coil of wire 64. Preferably, at least a portion of the coil assembly 62 axially overlaps the end portion 56 of the permanent magnet elements 52 that extend past the one end 58 of the rotor core 50 as illustrated in FIG. 2. Also, it is preferred that the coil assembly 62 be positioned generally concentric with the permanent magnet elements 52.

In general, coil fixture 66 is mounted on a printed circuit board 70 positioned axially adjacent to the rotor 16. The coil fixture 66 may include mounting members 72 for mounting the coil assembly 62 to the printed circuit board 70 so that the coil assembly 62 is axially adjacent the one end 58 of the rotor core 50. The control circuit 24 is also mounted to the printed circuit board 70 for processing the output signal of the coil assembly 62 into a commutation signal for commutating the main winding of the stator 14.

Figure 3:
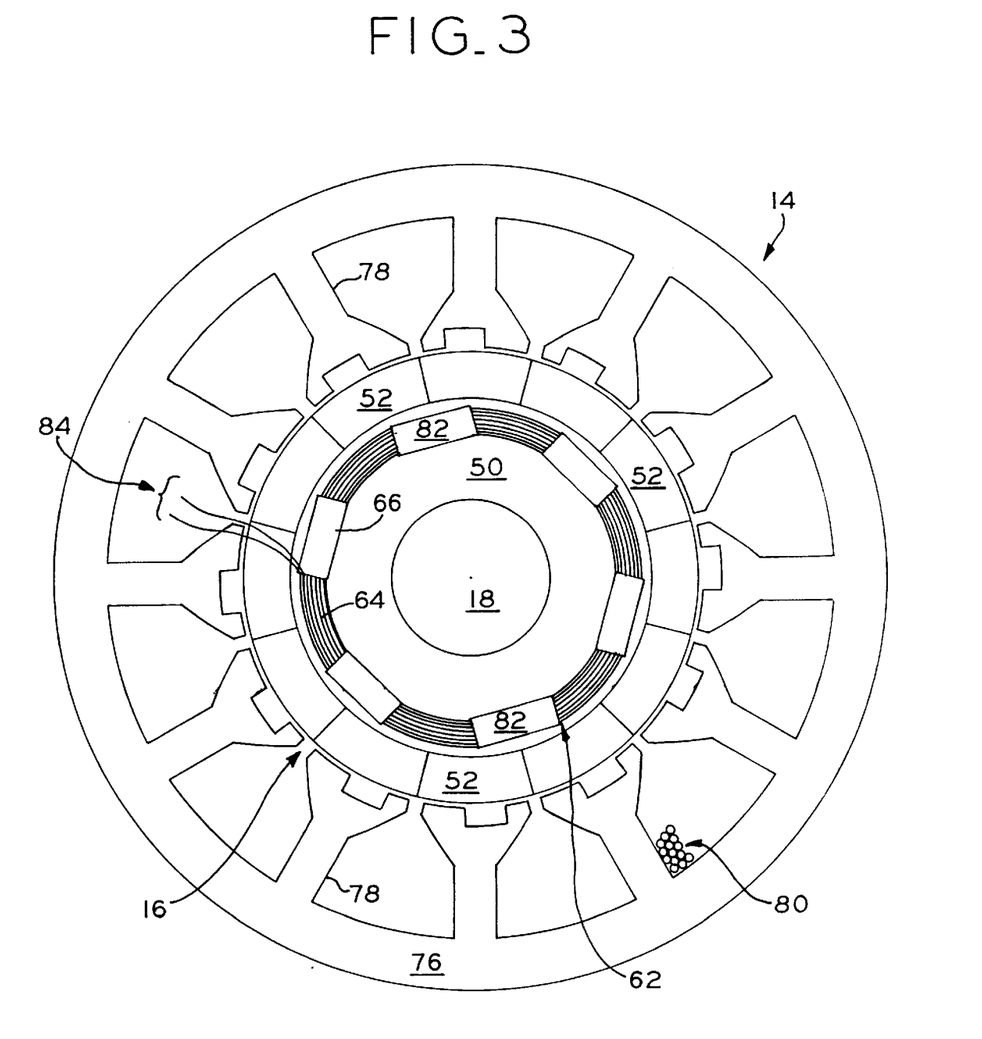
FIG. 3 is a top view of the coil assembly of FIG. 2.

FIG. 3 illustrates portions of motor 12 which includes coil assembly 62 in addition to stator 14 and rotor 16. In a preferred embodiment, stator 14 and rotor 16 are magnetically coupled and rotor 16 rotates about a central axis of rotation coaxial with shaft 18. Stator 14 includes a stator core 76 having a plurality of teeth 78 which are wrapped by a winding, portions of which are generally indicated 80. As such, electrically energizing winding 80 generates an electromagnetic field for rotating rotor 16.

In view of the shape of stator teeth 78, the conventional way to wind the pole is to "sew" the wire constituting winding 80 around each stator tooth 78 for the required number of turns. Commonly assigned application Ser. No. 08/678,524 describes an alternative method of installing winding 80 on stator teeth 78 using a high speed bobbin coil winding machine.

Preferably, the stator core 76 is a stack of steel laminations held together by winding 80 itself, welding, adhesive bonding or another suitable means. Alternatively, stator core 76 is an integral piece of steel. Those skilled in the art will understand all suitable means for holding the laminations together. While stator 14 is illustrated for purposes of disclosure, it is contemplated that other stationary assemblies of various other constructions having different shapes or winding patterns and with different numbers of teeth may be utilized within the scope of the invention so as to meet at least some of the objects thereof.

As described above, rotor 16 includes a number of permanent magnet elements 52. In the illustrated embodiment, twelve permanent magnet elements 52 are situated on rotor core 50 of rotor 16. Energizing winding 80 establishes magnetic poles which provide a radial magnetic field relative to the permanent magnets 52. When the field intersects with the flux field of the magnet poles, rotor 16 rotates relative to stator 14 according to the relative polarity of the field and magnet poles to develop a torque in a desired direction. The developed torque is a direct function of the intensities or strengths of the magnetic fields. For example, in an electronically commutated motor, winding 80 is commutated without brushes by sensing the rotational position of rotor 16 as it rotates within stator core 76. Power switches 34 control the direction of current flow through winding 80 and, thus, control the direction of the magnetic field generated by stator 14. Because the position of rotor 16 is known via position sensor 44 (i.e., coil assembly 62), control circuit 24 is able to control the magnetic field in stator 14 to cause rotor 16 to rotate in a desired direction.

As shown in FIG. 3, coil assembly 62, comprising the coil fixture 66 in mating relationship with the coil of wire 64, is positioned axially adjacent to the rotor 16. In this embodiment, coil fixture 66 defines a plurality of pole pieces 82. As illustrated, the diameter of the coil assembly 62 is designed so that the pole pieces 82 are inside the diameter of the permanent magnet elements 52 that extend past the one end 58 of the rotor core 50. In addition, it should be noted that the inside diameter of the coil assembly 62 is large enough to pass the bearing during motor construction. Preferably, the coil of wire 64 is terminated with leads 84 suitable for connection to the printed circuit board 70.

Further, the coil assembly 62 is positioned substantially independent of the magnetic coupling relationship between the main winding 80 of the stator 14 and the rotor 16. In one preferred embodiment, coil assembly 62 is placed in quadrature relationship (i.e., 90°) to the stator 14, but because it is at a distance from the stator, it is not limited to this orientation. By using the flux from the inside of the end portions 56 of the permanent magnet elements 52, influence on the coil assembly 62 from the main winding 80 of the stator 14 is reduced.

The coil assembly 62 generates an output signal representative of rotor angular position relative to the stator 14. The output signal of the coil assembly 62 is used to generate a commutation signal for commutating the main winding 80 of the stator 14 thereby optimizing torque production of the motor 12. The output signal generated by the coil assembly is processed to optimize torque production of the motor in much the same way as an output signal from a quadrature axis winding is processed in commonly assigned application Ser. No. 08/680,010, filed Jul. 15, 1996, the entire disclosure of which is incorporated herein by reference.

Figure 4:
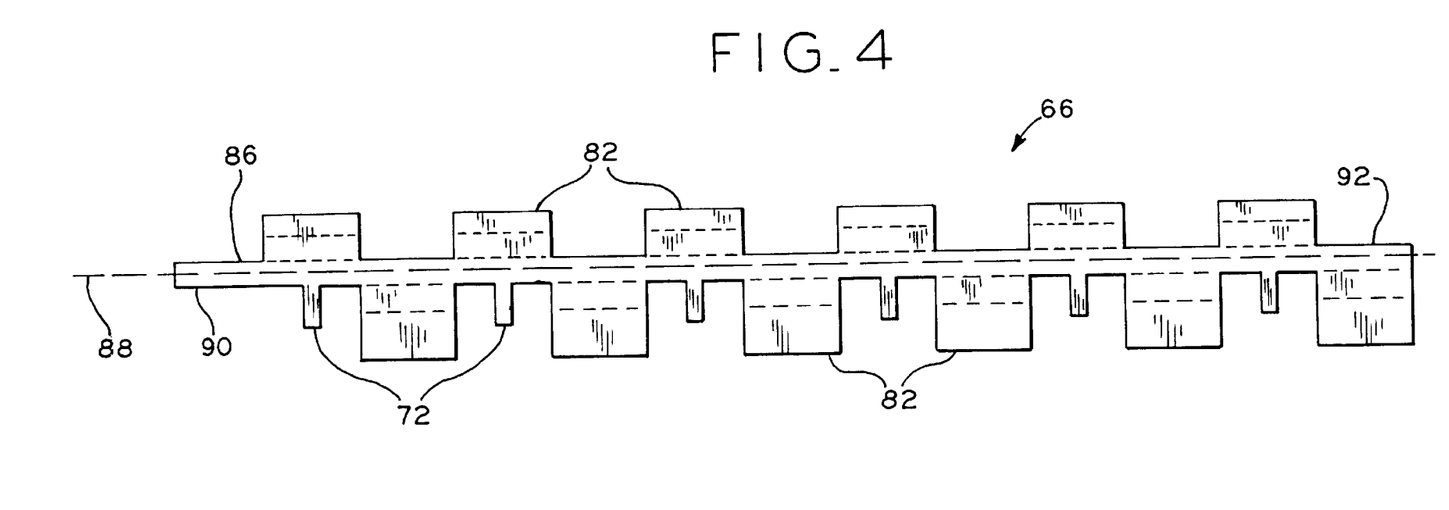
FIG. 4 is a top view of a blank used in forming the coil assembly of FIG. 2.

FIG. 4 is a top view of a coil fixture 66 in a flat, or planar, form. The coil fixture 66 may be initially flat or planar with a central portion 86 defining a central axis 88 and having two ends 90 and 92. The plurality of pole pieces 82 are integrally formed with the central portion 86 and extend therefrom generally perpendicular to the central axis 88. The coil fixture 66 may also include mounting members 72, as explained above, integrally formed with the central portion and extending therefrom generally perpendicular to the central axis 88 for positioning the coil assembly relative to the stator. Preferably, the coil fixture 66 comprises a blank stamped from a magnetic material such as motor lamination steel.

The coil assembly 62 is formed by bringing the two ends 90 and 92 of the blank coil fixture 66 together and fastening them together so that the coil fixture 66 forms a generally circular shape corresponding to the shape of the coil of wire 64. One method of fastening the ends 90 and 92 together is to use a spot weld. The coil of wire 164 is then placed around the generally circular coil fixture 66 and the pole pieces 82 are bent over the coil of wire 64 to create a mating relationship between the coil fixture 66 and coil of wire 64 and to secure the coil of wire 64 against movement relative to the central portion 86 of the coil fixture 66.

In one preferred embodiment, the output signal of the coil assembly 62 is a function of current induced in the coil of wire 64. As current is applied to the main winding 80 of the stator 14, magnetic flux is picked up by the pole pieces 82 from the inside of the end portions 56 of the permanent magnet elements 52. The flux picked up by the pole pieces 82 is averaged over all the poles, so the jitter due to magnet arc gaps and other asymmetries is greatly reduced as compared with other position sensors such as a single point Hall device.

In another preferred embodiment of the invention, the output signal of the coil assembly 62 has a predefined angular relationship with the rotor 16 position. For example, the coil assembly 62 may be positioned relative to the stator 14 so that the pole pieces 82 are positioned out-of-phase with respect to the main winding 80 of the stator 14. Preferably, the coil assembly 62 is positioned about 90 electrical degrees out-of-phase from the main winding 80 of the stator 14.

Figure 5:
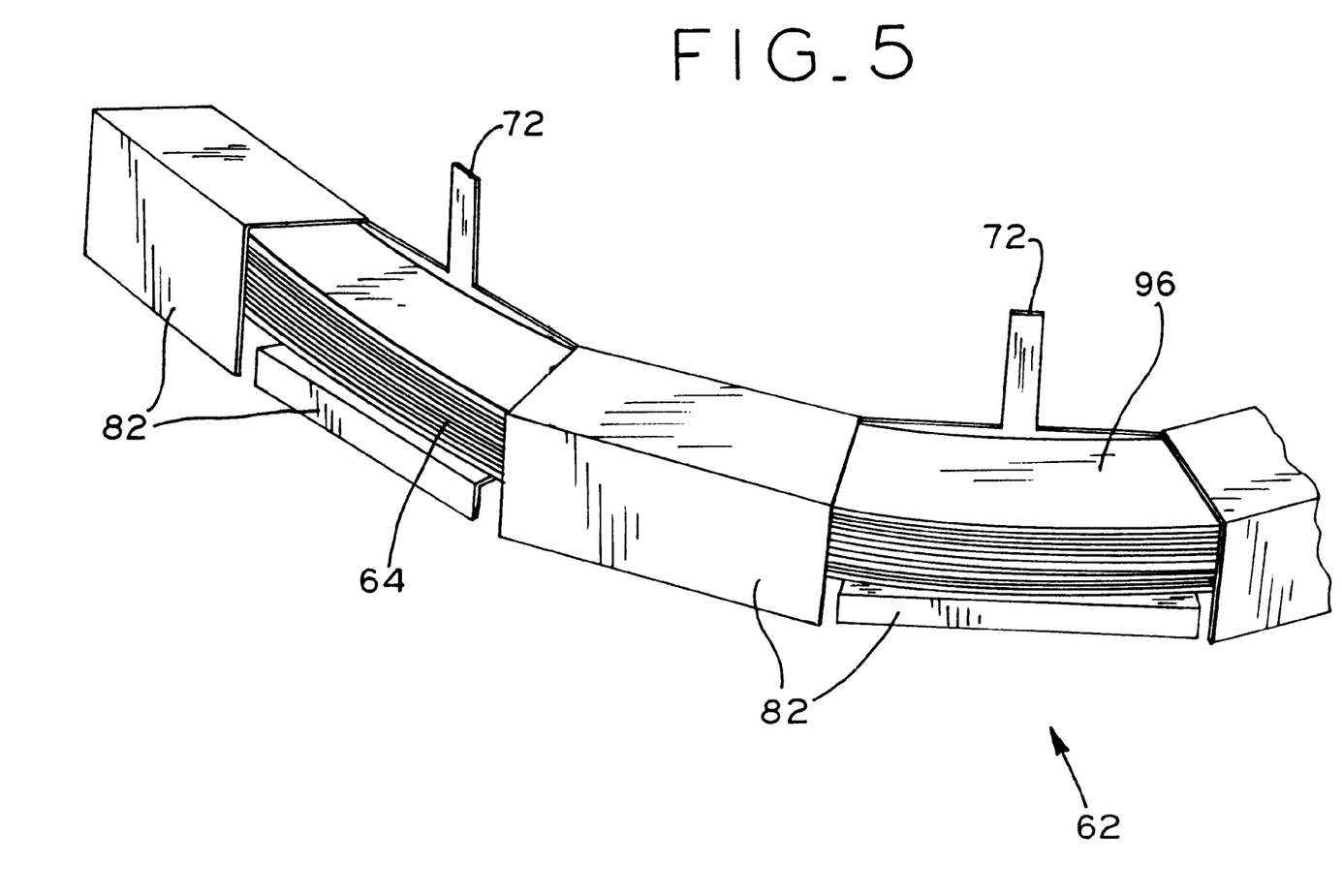
FIG. 5 is an enlarged, fragmentary perspective of the coil assembly of FIG. 2.

FIG. 5 is an enlarged view of coil assembly 62 illustrating the pole pieces 82 of the coil fixture 66 bent over the coil of wire 64 to create a mating relationship between the coil fixture 66 and the coil of wire 64. The coil of wire 64 may be wound on a bobbin 96 before the pole pieces 82 are bent over the coil of wire 64 to form the coil assembly 62 as illustrated.

Figures 6, 6A:
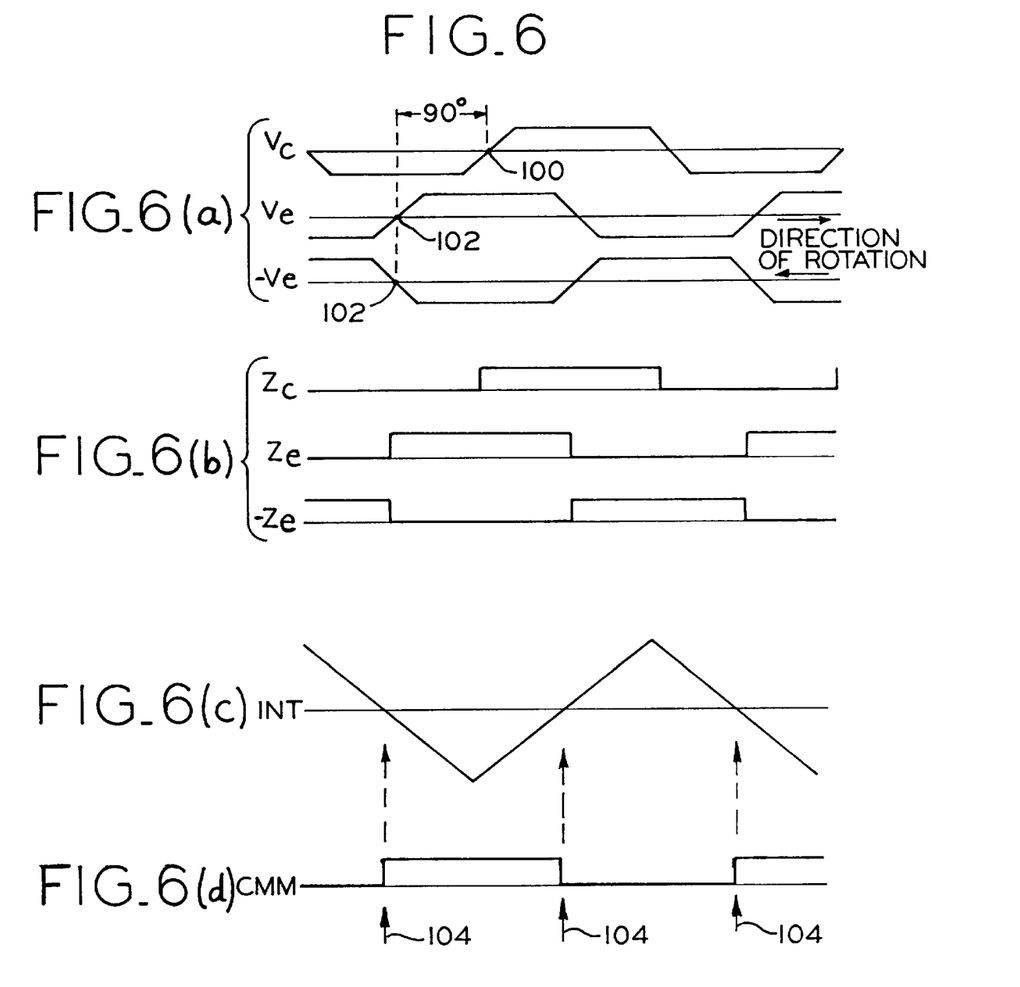
FIG. 6 is a set of exemplary timing diagrams illustrating the relationship between the back EMF and output signals of the coil assembly and a preferred commutation strategy of the invention.

FIG. 6 illustrates exemplary waveforms of the signals processed by control circuit 24 with respect to time. FIG. 6(a) shows the idealized voltage in coil assembly 62 (i.e., $V_c$). FIG. 6(a) also shows the idealized back EMF waveform (i.e., $V_e$ or $-V_e$ depending on the direction of rotation) in the main winding 80 of stator 14. Observed from coil assembly 62, the voltage induced in the torque producing main winding 80 of stator 14 is shown for different directions of rotation. As described above, coil assembly 62 is preferably positioned approximately 90° out-of-phase from the main winding 80 of stator 14. Thus, the phase difference between the two signals is approximately 90°. As an example, the 90° phase difference is indicated in FIG. 6(a) as the difference between a zero crossing 100 on the $V_c$ waveform and zero crossings 102 on the $\pm V_e$ waveforms. FIG. 6(b) shows the digital representations of the coil assembly 62 output signal and direct signals from the main winding 80 of the stator 14, referred to as $Z_c$ and $\pm Z_e$. For example, the digital representation $Z_c$ of the coil assembly 62 output signal $V_c$ is obtained by detecting the zero crossing of the waveform using a comparator (not shown).

Since back EMF signals are generated only when rotor 16 is moving, position information is not available when motor 12 is at a standstill. Thus, in a preferred embodiment, motor 12 initially operates according to a starting algorithm. As a result of the current applied to the main winding 80 of stator 14, motor 12 generates torque in either direction of rotation and rotor 16 starts moving. As soon as rotor 16 moves, voltage is induced in coil assembly 62 and the digital representation of this signal (i.e., $Z_c$) is available for processing. Once rotor 16 is moving, however, commutation is preferably synchronized to the coil assembly 62 output signal $V_c$.

In a preferred embodiment, the control circuit 24 monitors the speed of rotor 16 by measuring the time interval between commutation instances. As an example, for a twelve-pole motor with 180° conduction intervals, twelve commutation instances occur for every mechanical revolution of the rotor. The number of commutations per mechanical revolution varies with the number of rotor poles. The length of the conduction interval could be less than 180° in certain applications. In this manner, the control circuit 24 is able to calculate the speed of motor 12 based on the time interval between commutations. In the alternative, it is to be understood that various other speed sensors or circuits may be used for detecting the speed of rotor 16.

Referring again to FIG. 6, FIG. 6(c) illustrates the integral of signal $Z_c$ (i.e., the digital representation of the coil assembly voltage), INT. In this approach, the amplitude of $Z_c$ is independent of motor speed. FIG. 6(d) illustrates an exemplary commutation signal CMM, which is a function of the integrated signal INT, for causing commutation in motor 12. In this case, the advance angle is zero and a 90° delay from the coil assembly 62 output signal is provided. Commutation instances 104 coincide with the zero crossings of the main winding 80 voltage, indicated at reference character 102 on the $V_e$ and $-V_e$ waveform, for example. This allows maximum accelerating torque at low speeds.

In view of the above, it will be seen that the several objects of the invention are achieved and other advantageous results attained.

As various changes could be made in the above products and methods without departing from the scope of the invention, it is intended that all matter contained in the above description and shown in the accompanying drawings shall be interpreted as illustrative and not in a limiting sense.

What is claimed is:

1. A motor comprising:

a rotor having a generally cylindrical rotor core and a plurality of permanent magnet elements generating a magnetic field, said permanent magnet elements being situated radially on an outer surface of the rotor core so that each permanent magnet element has an axially facing end portion which extends past one end of the rotor core;

a stator having a main winding which is in magnetic coupling relationship with the rotor, said stator and said rotor being positioned radially with respect to each other and defining an air gap therebetween, said end portion of each permanent magnet element also extending past one end of the stator;

a coil assembly generating an output signal representative of rotor angular position relative to the stator when the rotor is rotating, said coil assembly being positioned axially adjacent the one end of the rotor core in magnetic coupling relationship with the rotating magnetic field of the permanent magnet elements of the rotor and substantially independent of the magnetic coupling relationship between the main winding of the stator and the rotor, said coil assembly comprising a coil of wire generating the output signal and a coil fixture for holding the coil of wire axially adjacent the one end of the rotor core; and a control circuit receiving and responsive to the output signal for commutating the main winding as a function of the rotor angular position.

2. The motor of claim 1 wherein at least a portion of the coil assembly axially overlaps the end portions of the permanent magnet elements which extend past the one end of the rotor core.

3. The motor of claim 1 further comprising a printed circuit board on which the control circuit is mounted, said printed circuit board being positioned axially adjacent to the one end of the rotor core, and wherein the coil fixture includes at least one mounting member for mounting the coil assembly on the printed circuit board.

4. The motor of claim 1 wherein the output signal is a function of current induced in the coil of wire and has an angular relationship with back electromotive force generated by the main winding of the stator.

5. The motor of claim 1 wherein the coil assembly includes a plurality of pole pieces which define a position of the coil assembly and wherein the coil assembly is positioned relative to the stator so that the output signal is out-of-phase with respect to the back electromotive force generated by the main winding of the stator.

6. The motor of claim 5 wherein the coil assembly is positioned so that the output signal is about ninety electrical degrees out-of-phase from back electromotive force of the main winding of the stator.

7. The motor of claim 1 wherein the coil assembly is positioned generally concentric with the permanent magnet elements.

8. The motor of claim 1 wherein the coil fixture comprises a plurality of pole pieces formed from a magnetic material.

9. The motor of claim 8 wherein the output signal has an angular relationship with back electromotive force generated by the main winding of the stator and wherein the position of the pole pieces relative to the main winding of the stator defines the angular relationship.

10. The motor of claim 8 wherein the stator has a plurality of poles and wherein the number of pole pieces of the coil fixture is a function of the number of poles of the stator.

11. The motor of claim 8 wherein the magnetic material is motor lamination steel.

12. The motor of claim 8 wherein the coil fixture comprises a generally planar central portion defining a central axis and wherein the pole pieces are integrally formed with the central portion and extend therefrom generally perpendicular to the central axis.

13. A motor comprising:

a rotor having a generally cylindrical rotor core and a plurality of permanent magnet elements, said permanent magnet elements being situated radially on an outer surface of the rotor core so that each permanent magnet element has an axially facing end portion which extends past one end of the rotor core;

a stator having a main winding which is in magnetic coupling relationship with the rotor, said stator and said rotor being positioned radially with respect to each other and defining an air gap therebetween, said end portion of each permanent magnet element also extending past one end of the stator;

a coil assembly generating an output signal representative of rotor angular position relative to the stator, said coil assembly being positioned generally concentric with the permanent magnet elements in magnetic coupling relationship with the rotor and substantially independent of the magnetic coupling relationship between the main winding of the stator and the rotor, said coil assembly comprising a coil of wire generating the output signal and a coil fixture for holding the coil of wire axially adjacent the one end of the rotor core, said coil fixture being formed into a generally circular shape corresponding to the shape of the coil of wire and having a mating relationship with the coil of wire in which the pole pieces are bent relative to the plane of the central portion over the coil of wire for holding the coil of wire relative to the central portion of the coil fixture; and a control circuit receiving and responsive to the output signal for commutating the main winding as a function of the rotor angular position.

14. A motor comprising:

a rotor having a generally cylindrical rotor core and a plurality of permanent magnet elements, said permanent magnet elements being situated radially on an outer surface of the rotor core so that each permanent magnet element has an axially facing end portion which extends past one end of the rotor core;

a stator having a main winding which is in magnetic coupling relationship with the rotor, said stator and said rotor being positioned radially with respect to each other and defining an air gap therebetween, said end portion of each permanent magnet element also extending past one end of the stator;

a coil assembly generating an output signal representative of rotor angular position relative to the stator, said coil assembly being positioned generally concentric with the permanent magnet elements in magnetic coupling relationship with the rotor and substantially independent of the magnetic coupling relationship between the main winding of the stator and the rotor, said coil assembly comprising a coil of wire generating the output signal and a coil fixture for holding the coil of wire axially adjacent the one end of the rotor core, said coil fixture comprising a mounting member integrally formed with the central portion and extending therefrom generally perpendicular to the central axis for positioning the coil assembly relative to the stator; and a control circuit receiving and responsive to the output signal for commutating the main winding as a function of the rotor angular position.

15. A position sensor for use with a motor, said motor including a rotor and a stator, said rotor having a generally cylindrical rotor core and a plurality of permanent magnet elements generating a magnetic field, said permanent magnet elements being situated radially on an outer surface of the rotor core so that each permanent magnet element has an axially facing end portion which extends past one end of the rotor core, said stator having a main winding which is in magnetic coupling relationship with the rotor, said stator and said rotor being positioned radially with respect to each other and defining an air gap therebetween, said end portion of each permanent magnet element also extending past one end of the stator, said position sensor comprising:

a coil of wire;

a coil fixture for holding the coil of wire, said coil fixture including a plurality of pole pieces and being positioned axially adjacent the one end of the rotor core so that the coil of wire and pole pieces are in magnetic coupling relationship with the rotating magnetic field of the permanent magnet elements of the rotor and substantially independent of the magnetic coupling relationship between the main winding of the stator and the rotor; and a pair of leads connected to the ends of the coil of wire for providing an output signal representative of current induced in the coil of wire as a function of the rotor angular position relative to the stator when the rotor is rotating.

16. A method of generating a rotor angular position signal for use in controlling a motor, said motor including a rotor and a stator positioned radially with respect to each other and defining an air gap therebetween, said rotor having a generally cylindrical rotor core and a plurality of permanent magnet elements situated thereon, said permanent magnet elements generating a magnetic field and said stator having a main winding which is in magnetic coupling relationship with the rotor, said method comprising the steps of:

situating the permanent magnet elements on an outer surface of the rotor core so that each permanent magnet element has an axially facing end portion which extends past one end of the rotor core and which also extends past one end of the stator;

assembling a coil assembly for generating an output signal representative of rotor angular position relative to the stator when the rotor is rotating by winding a coil of wire into a generally circular shape and retaining the coil of wire in a coil fixture, said coil fixture and said coil of wire having a mating relationship; and positioning the coil assembly axially adjacent the one end of the rotor core in magnetic coupling relationship with the rotating magnetic field of the permanent magnet elements of the rotor and substantially independent of the magnetic coupling relationship between the rotor and the stator.

17. The method of claim 16 wherein the step of positioning the coil assembly includes positioning the coil fixture so that at least a portion of the coil of wire axially overlaps the end portions of the permanent magnet elements which extend past the one end of the rotor core.

18. The method of claim 16 further comprising the step of generating the output signal as a function of current induced in the coil of wire which has an angular relationship with back electromotive force generated by the main winding of the stator.

19. The method of claim 16 wherein the coil assembly includes a plurality of pole pieces which define a position of the coil assembly and wherein the step of positioning the coil assembly includes positioning the coil assembly relative to the stator so that the output signal is out-of-phase with respect to back electromotive force generated by the main winding of the stator.

20. The method of claim 19 wherein the coil assembly is positioned so that the output signal is about ninety electrical degrees out-of-phase from the back electromotive force of the main winding of the stator.

21. The method of claim 16 further comprising the step of positioning the coil assembly generally concentric with the permanent magnet elements.

22. The method of claim 16 wherein the coil fixture comprises a plurality of pole pieces and further comprising the step of forming the coil fixture from a magnetic material.

23. The method of claim 22 wherein the output signal has an angular relationship with back electromotive force generated by the main winding of the stator and wherein the position of the pole pieces relative to the main winding of the stator defines the angular relationship.

24. The method of claim 22 wherein the stator has a plurality of poles and wherein the step of forming the coil fixture includes defining the number of pole pieces to be a function of the number of poles of the stator.

* * * * *